United States Patent
Fuyama

[11] Patent Number: 5,335,171
[45] Date of Patent: Aug. 2, 1994

[54] ELECTRONIC REGISTER

[75] Inventor: Seiji Fuyama, Yokohama, Japan

[73] Assignee: Matsushita Electric Industrial Co., Ltd., Osaka, Japan

[21] Appl. No.: 842,628

[22] Filed: Feb. 27, 1992

[30] Foreign Application Priority Data

Mar. 11, 1991 [JP] Japan .................. 3-044804

[51] Int. Cl.⁵ ............................................ G07G 1/12
[52] U.S. Cl. ................... 364/405; 364/404; 235/378
[58] Field of Search ............ 364/404, 405; 235/378, 235/385, 383, 438

[56] References Cited

U.S. PATENT DOCUMENTS

| | | | |
|---|---|---|---|
| 4,752,875 | 6/1988 | Takebayashi | 364/405 |
| 4,859,838 | 8/1989 | Okiharu | 235/383 |
| 4,870,577 | 9/1989 | Karasawa et al. | 364/405 |
| 4,879,649 | 11/1989 | Ishii | 364/405 |

FOREIGN PATENT DOCUMENTS

| | | |
|---|---|---|
| 55-63466 | 5/1980 | Japan . |
| 60-169996 | 9/1985 | Japan . |
| 2141857 | 1/1985 | United Kingdom . |
| 8810480 | 12/1988 | World Int. Prop. O. . |

*Primary Examiner*—Roy N. Envall, Jr.
*Assistant Examiner*—Khai Tran
*Attorney, Agent, or Firm*—Stevens, Davis, Miller & Mosher

[57] ABSTRACT

This electronic register operates so that when a sales item requiring input of its sub-item information is to be registered, the correct sub-item information can be inputted without fail. The number of the sub-items is in no way limited by the number of keys on the keyboard of the register. The electronic register includes a memory storing a PLU file, and information including price look up codes or PLU codes allotted to individual sales items, names of the individual items, unit prices of the individual items, compulsory input status information indicating that a sales item requires input of its sub-item information, sub-item status information indicating that an item represents sub-item information, and class code information for classifying the sub-items according to linkage with the corresponding sales items, are stored respectively in individual storage areas of the PLU file. At the time of registration of a sales item with an active compulsory input status information, the sub-items having the same class code are displayed together with their display line numbers on a display unit as candidate sub-items for registration. The sub-item is registered when the corresponding display line number is issued by manipulation of the keys on the keyboard.

14 Claims, 6 Drawing Sheets

| ☆☆ SUB-ITEM ☆☆ | TABL# 28 |
|---|---|
| 11 FRENCH<br>12 ITALIAN<br>13 HOUSE | BEER   450<br>SALAD  850 |

42 — SECOND DISPLAY AREA FOR CANDIDATE SUB-ITEMS FOR REGISTRATION

41 — FIRST DISPLAY AREA FOR REGISTERED ITEMS

FIG. 4B

| | TABL# 28 |
|---|---|
| | BEER   450<br>SALAD  850<br>FRENCH |

| PLU CODE | ITEM NAME | UNIT PRICE | COMPULSORY INPUT STATUS | SUB-ITEM STATUS | CLASS CODE |
|---|---|---|---|---|---|
| 100100 | SALAD | 850 | 1 | 0 | 1 |
| 100120 | FRENCH | 0 | 0 | 1 | 1 |
| 100462 | ITALIAN | 0 | 0 | 1 | 1 |
| 101230 | HOUSE | 0 | 0 | 1 | 1 |
| 201501 | STEAK | 1,600 | 1 | 0 | 2 |
| 201510 | RARE | 0 | 0 | 1 | 2 |
| 201511 | MEDIUM | 0 | 0 | 1 | 2 |
| 201512 | WELL | 0 | 0 | 1 | 2 |
| 312100 | BEER | 450 | 0 | 0 | 0 |
| 312101 | WHISKY | 950 | 0 | 0 | 0 |
| 312180 | JUICE | 280 | 0 | 0 | 0 |
|  |  |  |  |  |  |

ELECTRONIC REGISTER

BACKGROUND OF THE INVENTION

This invention relates to an electronic register which can register collateral information regarding sales items, such as information specifying manners for serving dishes in, for example, a restaurant.

A prior art electronic register is constructed so as to register a sales item by manipulating a respective item key on a keyboard, and another prior art electronic register is constructed so as to register a sales item by manipulating price look up code or PLU code input keys on a keyboard corresponding to an allotted PLU code for an individual sales item. Further, in addition to registering the selected sales items, the register can register collateral information of the sales items to be registered (for example, information regarding the requested manner for serving the dishes on order in a restaurant) by similarly manipulating item keys or PLU code input keys. The collateral information will be referred to hereinafter as a sub-item.

However, in the case of the former prior art register constructed to register sales items by manipulating item keys on the keyboard, the number of sales items is inevitably limited by the physical number of item keys provided on the keyboard. On the other hand, in the case of the latter prior art register as disclosed in JP-A-55-63466 or JP-A-60-169996 constructed to register sales items by manipulating PLU code input keys, additional processings are required such as preliminary printing of the PLU codes on the sales items so as to establish one-to-one correspondence between the sales items and the PLU codes. Also, in both of the prior art registers, the operator should input the sub-items by individual key manipulation on the keyboard as in the case of inputting the sales items. Therefore, when it is required to register a sales item with its sub-item information, the operator tends to forget registration of the sub-item information or to register wrong sub-item information.

SUMMARY OF THE INVENTION

With a view to solve the prior art problems as pointed out above, it is an object of the present invention to provide an electronic register which can reliably input correct sub-item information without forgetting when registration of a sales item requires input of such sub-item information, and in which the number of registering items is no way limited by the number of keys on its keyboard.

In accordance with one aspect of the present invention which attains the above objects, there is provided an electronic register comprising a keyboard having numeric keys and various kinds of special-purpose keys, a memory for storing totalized data, registered data and previously set data, a display unit for displaying data to be displayed, means for storing various information in individual storage areas respectively of a PLU file in the memory, the information including PLU codes, names and unit prices of the individual sales items, compulsory input status information indicating that a specific sales item requires input of its sub-item information, collateral status information indicating that a specific sales item has sub-item information, and class code information for classifying the sub-items to be linked with each other, means for displaying the sub-items having the same class code with line numbers so as to provide candidate sub-items for registration on the display unit at the time of registration of a sales item set with its compulsory input status information, and means for registering the sub-item corresponding to the display line number when the display line number is issued by manipulation of the keys on the keyboard.

Therefore, according to the present invention, when a compulsory input status information is set at the time of registration of a corresponding PLU item, all sub-items having the same class code as that of this PLU item are read out from the PLU file and displayed on the display unit with the name of the item having the respective sub-item information corresponding to the display line numbers. Also, when a sub-item corresponding to the display line number is issued by key manipulation on the keyboard, the specific sub-item is registered.

DESCRIPTION OF THE PREFERRED EMBODIMENTS

Preferred embodiments of the present invention will now be described by reference to the accompanying drawings.

Figure 1:
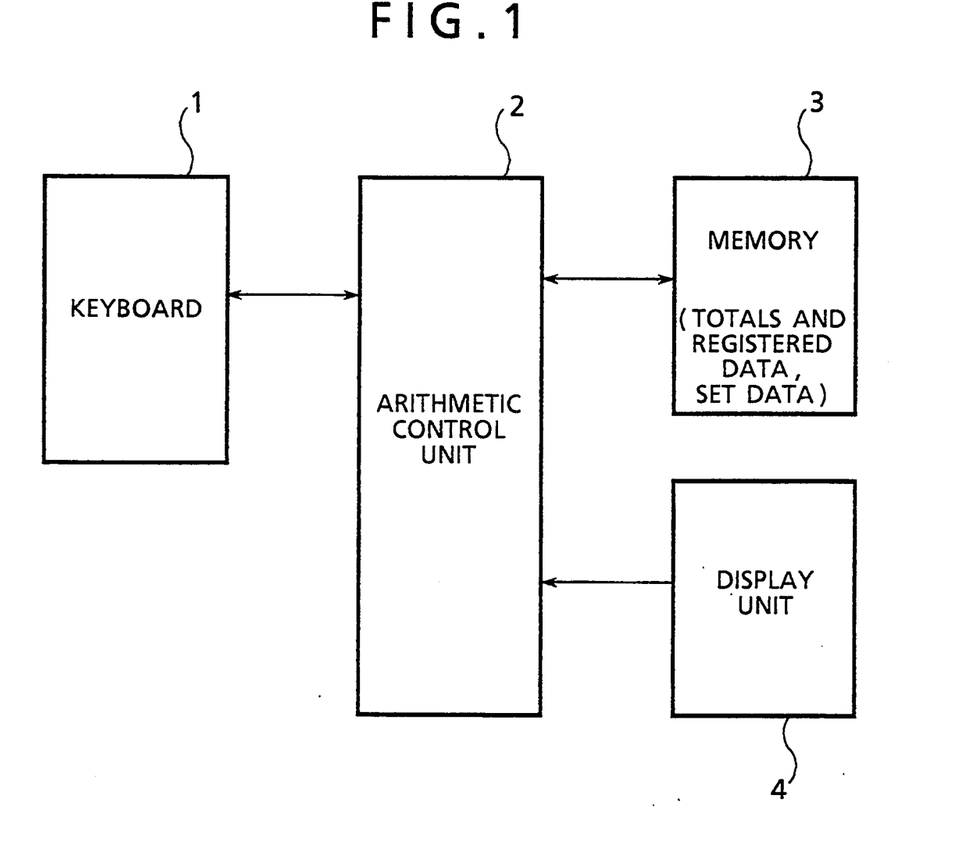
FIG. 1 is a block diagram schematically showing the basic structure of an embodiment of the electronic register according to the present invention.

FIG. 1 is a block diagram schematically showing the basic structure of the electronic register according to the present invention.

Referring to FIG. 1, an arithmetic control unit 2 is connected to a keyboard 1, and a memory 3 and a display unit 4 are connected to the arithmetic control unit 2.

The keyboard 1 is provided with various kinds of keys including numeric keys, sales item keys, a totalizing key, etc. When any one of the keys on the keyboard 1 is manipulated, a corresponding key code is generated and applied to the arithmetic control unit 2. The arithmetic control unit 2 includes a read-only memory (a ROM) (not shown) therein, and this ROM stores processing programs for executing various tasks of the electronic register.

Figure 2:
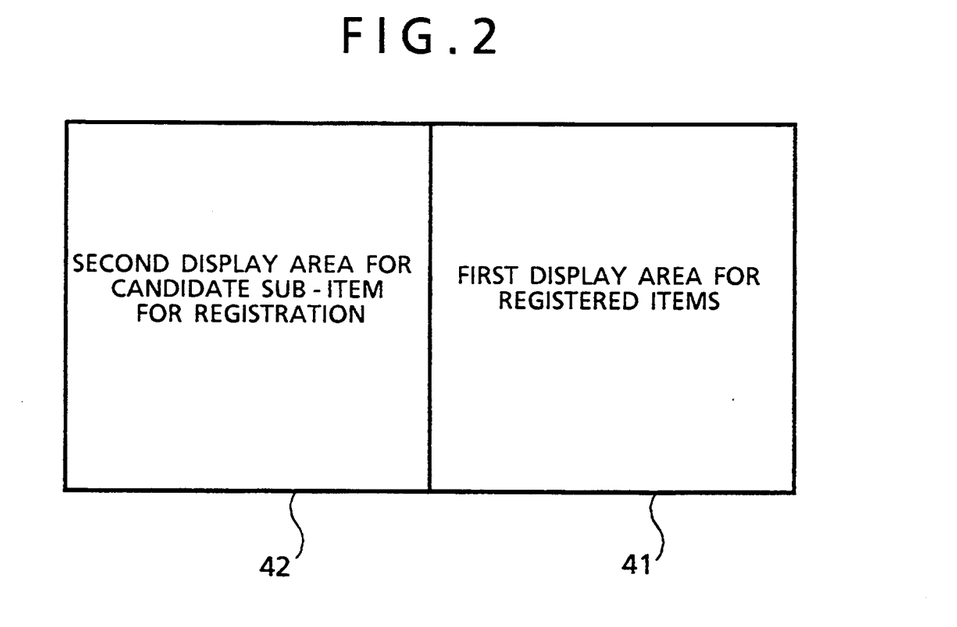
FIG. 2 illustrates display areas on the display unit of the electronic register.

The memory 3 includes a totalized or registered data memory region for storing totalized data to be reported and a setting data memory region for reading out sales item information including names, unit prices, etc. of sales items inputted from the keyboard 1. The display unit 4 displays registered data, and, when a registered sales item requires input of its collateral information (referred to hereinafter as a sub-item), displays corresponding candidate sub-items for registration. For this purpose, the display screen of the display unit 4 is divided into a first display area 41 for registered items and a second display area 42 for candidate sub-items for registration as shown in FIG. 2.

Figure 3:
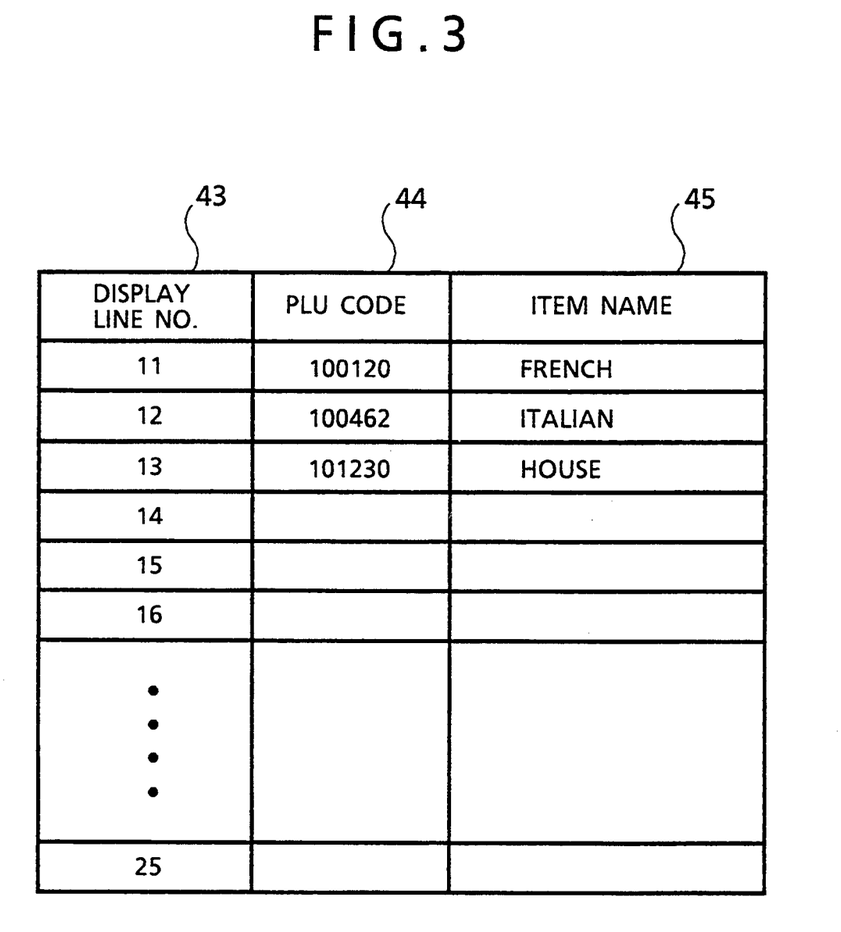
FIG. 3 illustrates the contents of a display file of candidate sub-items for registration incorporated in the display unit of the electronic register.

FIG. 3 shows the contents of a display file of candidate sub-items for registration incorporated in the display unit 4. In this candidate sub-item display file, PLU codes generally designated by numeral 44 and sub-item names generally designated by numeral 45 are filed together with each of associated display line numbers generally designated by numeral 43 as shown in FIG. 3. The example of the display for the stored data of the file shown in FIG. 4A indicates that the display line numbers 43 and the associated sub-item names 45 are displayed on the second display area 42, and that the sales item names, BEER, SALAD and so on, and their unit prices are displayed on the first display area 41.

Figure 5:
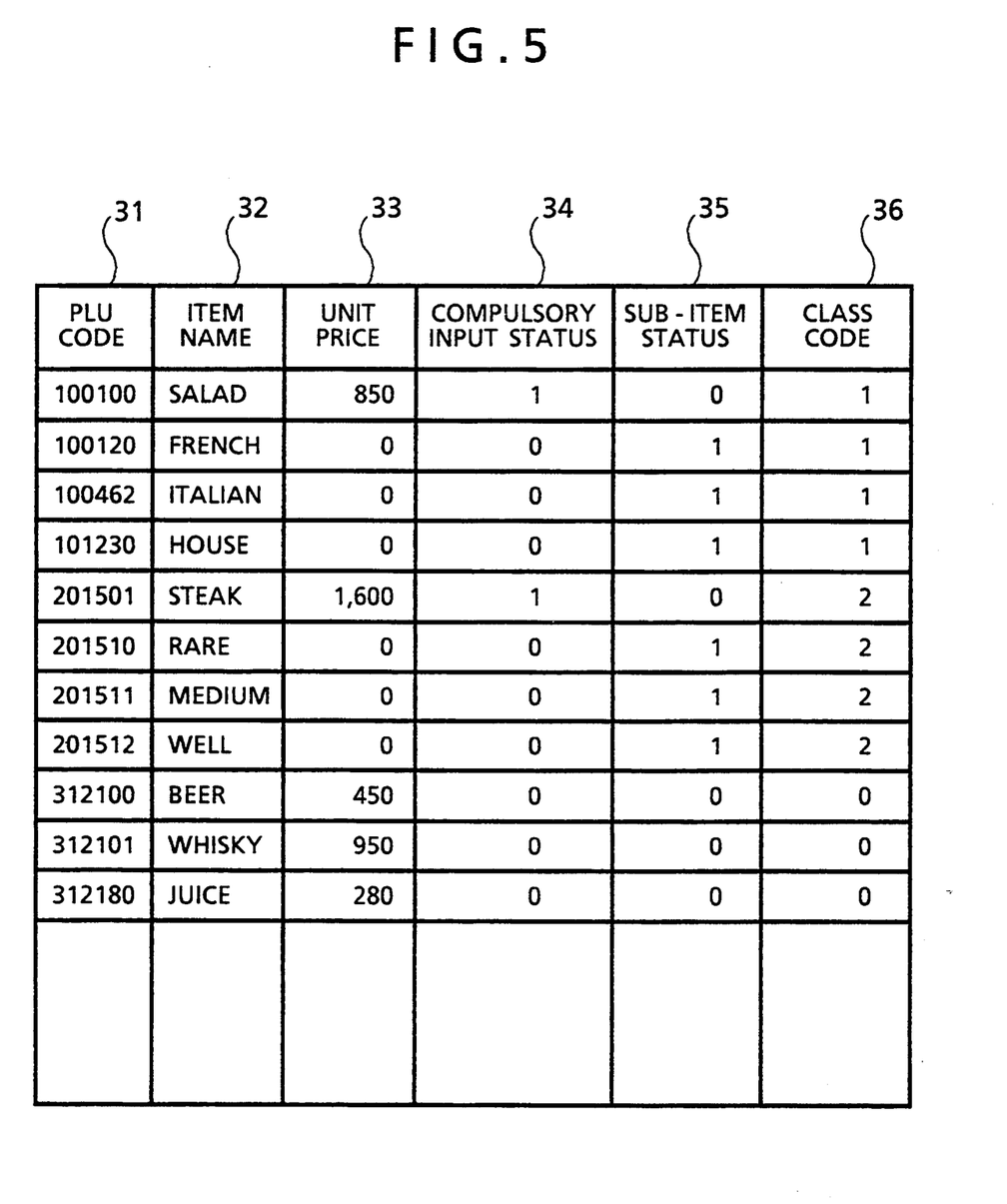
FIG. 5 illustrates previously set data filed in a PLU file stored in the memory of the electronic register.

FIG. 5 shows the structure of stored data of the PLU file in the memory 3. The stored data of the PLU file include a PLU code generally designated by numeral 31, an item name (SALAD, FRENCH, ITALIAN, etc.) generally designated by numeral 32, a unit price generally designated by numeral 33, a compulsory input status information ("0" or "1") generally designated by numeral 34, a sub-item status information ("0" or "1") generally designated by numeral 35 and a class code ("0", "1" or "2") generally designated by numeral 36.

Figure 6:
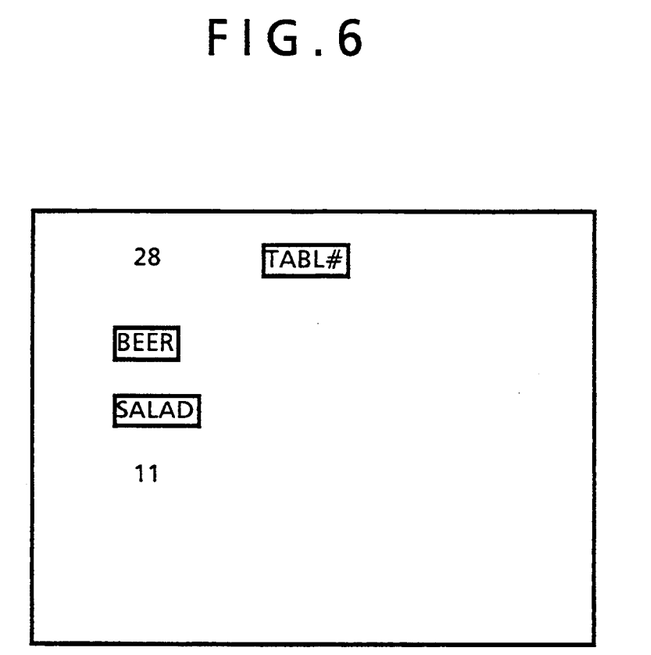
FIG. 6 illustrates an example of manipulation of registration keys on the keyboard of the electronic register.

The operation of the electronic register embodying the present invention will now be described by reference to FIG. 6 showing an example procedure of manipulation of the registration keys.

Figure 4A:
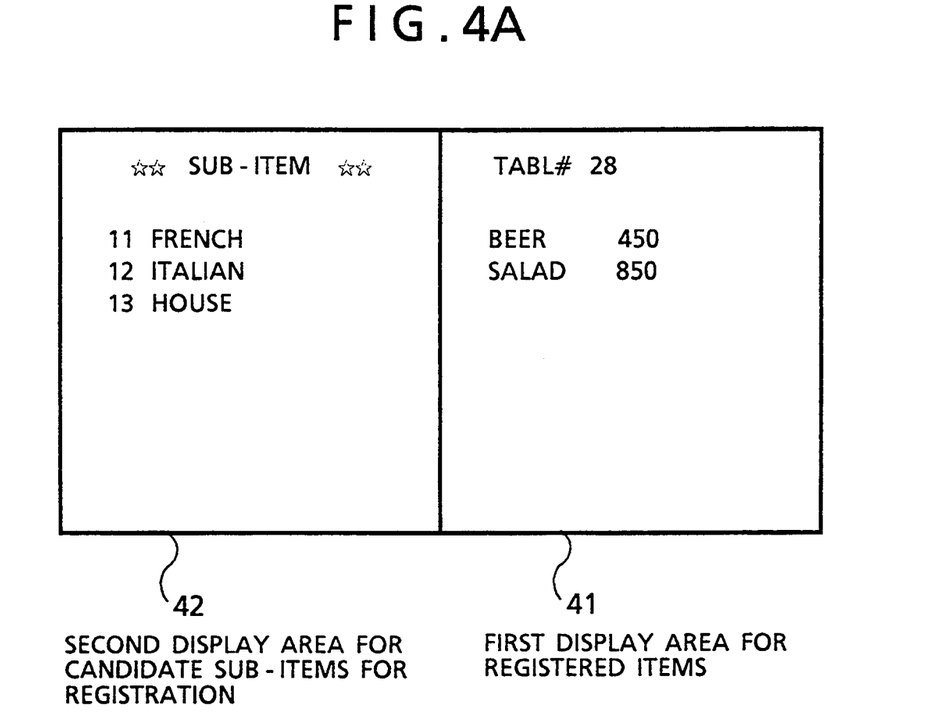
FIG. 4A illustrates an example of those displayed on the display areas of the display unit of the electronic register on the basis of the display file for candidate sub-items for registration.

Key manipulation 28 "TABL#" indicated in FIG. 6 is performed to specify the table number 28 prior to registration. By this manipulation, the specified table number is displayed in the first display area 41 for registered items on the display unit 4 as shown in FIG. 4A. Then, when the sales item key "BEER" on the keyboard 1 is manipulated, the corresponding item name 32 and unit price 33 are read out from the stored data in the PLU file (FIG. 5) of the memory 3 under control of the arithmetic control unit 2 on the basis of the PLU code "312100" (shown in FIG. 5) specified corresponding to the key code, and the item name and unit price are also displayed in the first display area 41 of the display unit 4 as shown in FIG. 4A.

Then, when the sales item key "SALAD" on the keyboard 1 is manipulated, the corresponding item name 32 and unit price 33 among the stored data are read out from the PLU file in the memory 3 on the basis of the PLU code "100100" corresponding to the specified key code, as in the case of the registration of the item "BEER", and the item name and unit price are displayed in the first display area 41 for registered items on the display unit 4 as shown in FIG. 4A.

The item "BEER" represented by the PLU code "312100" has not compulsory input status information 34 for sub-item input, sub-item status information 35 and class code 36 as shown in FIG. 5. On the other hand, the item "SALAD" represented by the PLU code "100100", is furnished with its compulsory input status information 34 and class code 36 as shown in FIG. 5. Therefore, sub-items having the same class code as that of the item "SALAD" are extracted from the PLU file of the memory 3 shown in FIG. 5, and three extracted sub-items "FRENCH" (whose PLU code is "100120"), "ITALIAN" (whose PLU code is "100462") and "HOUSE" (whose PLU code is "101230") are stored into the display file for candidate sub-items in the display unit 4 as shown in FIG. 3. Then, the contents of the display file are displayed on the registration second display area 42 of the display unit 4 for the candidate sub-items of the item "SALAD" with their display line numbers 43 as shown in FIG. 4A.

Figure 4B:
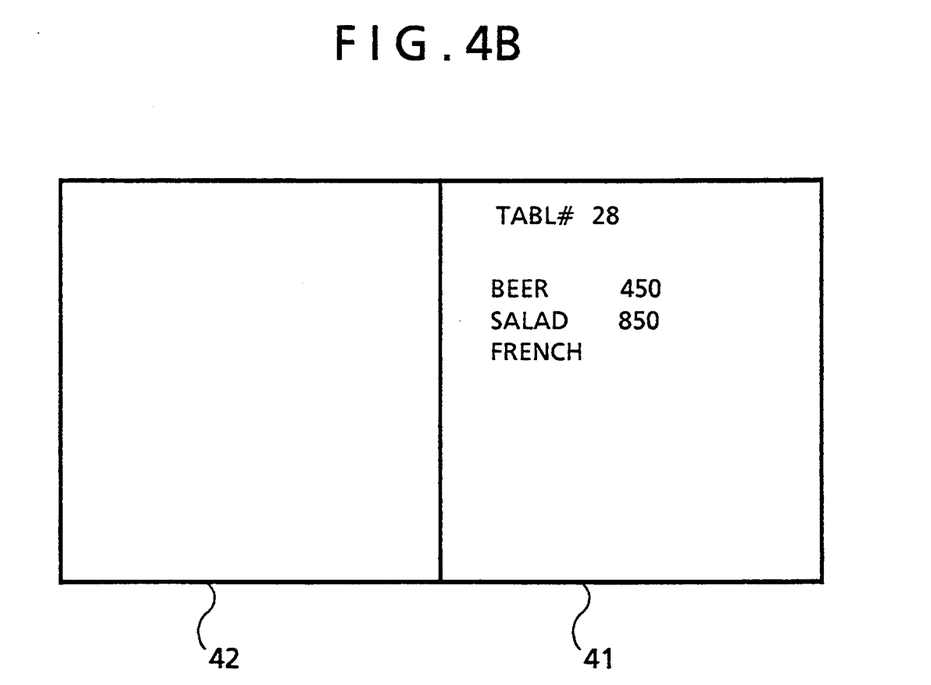
FIG. 4B illustrates an example of display on the registered item display area following to the step shown in FIG. 4A.
Figure 7:
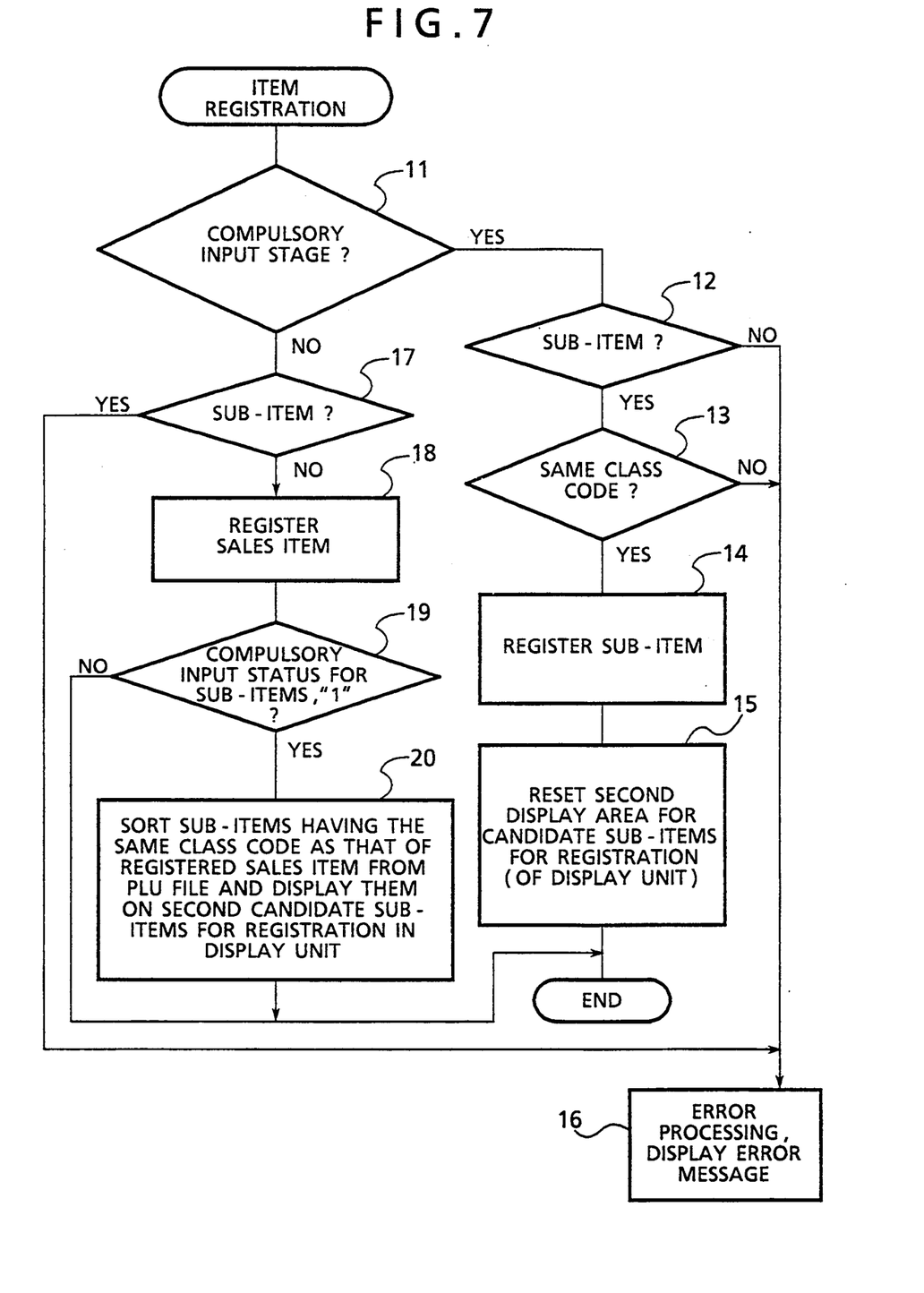
FIG. 7 is a flow chart showing the steps of registration processing in the electronic register.

Suppose, for example, that the display line number "11" is inputted by manipulation of the keys on the keyboard 1. In response to the above manipulation, the previously set data relating to the PLU code "100120" corresponding to the display line 11 of the display file for candidate sub-items displayed in the display unit 4 as shown in FIG. 3 is read out from the PLU file of the memory 3 as shown in FIG. 5 under control of the arithmetic control unit 2. After confirmation of the fact that the sub-item status 35 is set and the class code 36 is the same as that of the item "SALAD" on the basis of a registration flow chart as shown in FIG. 7, the sub-item "FRENCH" is registered and displayed as shown in FIG. 4B. After the registration of the sub-item "FRENCH", a group of candidate sub-items having been displayed on the second display area 42 of the display unit 4 is erased.

In the illustrated embodiment of the present invention, the display line number group 43 consists of the display line numbers "11" to "25" as shown in FIG. 3. This is because 15 display rows are available in the second display area 42 of the display unit 4, and then 2-digit numerals are required for distinguishing 15 items from each other. Therefore, display line numbers "01" to "15" may be used in lieu of the display line numbers "11" to "15". Further, sub-item keys may be disposed on the keyboard 1 so as to input the sub-items directly by manipulation of those keys.

The steps of the registration processing will now be described in detail by reference to FIG. 7.

First, in step 11, decision is made as to whether or not the electronic register is in the compulsory input stage (that is, in the state immediately after registration of a sales item when the compulsory input status information 34 in the PLU file of the memory 3 shown in FIG. 5 is set). When the result of the decision proves that the electronic register is in the compulsory input stage, decision is made in step 12 as to whether or not the needed input information is sub-item information. When the result of the decision proves that the input information is not sub-item information, processing for displaying an error message is executed in step 16. On the other hand, when the result of the decision proves that any sub-item information is provided, a decision is made in step 13 as to whether or not the class code of the sub-item is the same as that of the sales item. When the class code is not the same, the processing in step 16 is executed. On the other hand, when the class code is the same, the sub-item is registered in step 14 in the display file in the display unit 4 for candidate sub-items for registration shown in FIG. 3. Then, in step 15, the second display area 42 of the display unit 4 for candidate sub-items is erased as shown in FIG. 4B, and then the processing is completed.

On the other hand, when the result of the decision in step 11 proves that the electronic register is not in a compulsory input stage, decision is made in step 17 as to whether or not input information is sub-item information. When the result of the decision proves that any sub-item information is provided, the processing for the error message display in step 16 is executed. On the other hand, when the result of the decision in step 17 does not prove that the input information is sub-item information, the input information is sales item in step 18, and a decision is made in step 19 as to whether or not compulsory input status information 35 of the sales item is in the state "1". When the compulsory input status information 35 is in the state "1", sub-items having the same class code as that of the registered sales item are searched on the PLU file of the memory 3 shown in FIG. 5, and the extracted sub-items are displayed in step 20 on the second display area 42 of the display unit 4 for candidate sub-items shown in FIG. 4A, thereby completing the steps of processing. When the compulsory input status information is not in the state "1", the processing is immediately ended.

Thus, according to the illustrated embodiment of the present invention, when a sales item requiring input of a sub-item is registered, a group of sub-items to be selected are displayed as candidate sub-items for registration and informed to the operator, so that the operator can be prevented from forgetting application of the required sub-item input. And the operator may be aided to input correct sub-items by recognizing their class code set on the PLU file in the memory 3 at registration.

Further, displaying the candidate sub-items with the sub-item names and the display line numbers, the specific sub-item can be quickly inputted by manipulating the keys on the keyboard corresponding to the display line number. The candidate sub-items may be displayed according to their PLU code. However, when the number of sales items increases, the number of digits of each PLU code will become as large as 6 to 12. In such a case, manipulation of the keys corresponding to the PLU code is quite troublesome, and an undesirable key manipulation error tends to occur. According to the illustrated embodiment of the present invention, the number of digits of the display line number is only 1 or 2, so that the key manipulation for setting the display line number can be quickly done, and undesirable errors in key manipulation can be minimized.

It will be understood from the foregoing description of the present invention that, when compulsory input status information collateral to a PLU item is set at the time of registration of the PLU item, the sub-items having the same class code as that of the PLU item are read out from the PLU file, and the names of the sub-items are displayed together with their display line numbers on the display unit. Also, when the sub-item corresponding to the display line number is inputted from the keyboard by manipulation of the required keys, the specified sub-item is registered. Therefore, at the time of registration of a sales item for which input of its sub-item information is required, correct sub-item information can be reliably inputted without fail. Further, according to the present invention, the number of sales items is not limited by the number of keys on the keyboard.

I claim:

1. An electronic register for registering price look up (PLU) items allotted to individual sales items, each of the PLU items having a class code and compulsory input status information, the electronic register comprising:
   a PLU file for storing collateral information items, each of said collateral information items having a class code and an item name;
   reading-out means for reading out ones of said collateral information items having a class code which match a class code of a PLU item to be registered from the PLU file when the compulsory input status information of said PLU item to be registered indicates a requirement for further information;
   display means, having a display screen, for displaying the item names of said ones of said collateral information items read out by said reading-out means;
   input means for inputting a selection from among said ones of said collateral information items displayed by said display means; and
   means for registering the collateral information item whose selection is input through said input means.

2. An electronic register according to claim 1, wherein, after registration of the PLU item to be registered, if the PLU to be registered is to be associated with at least one sub-item, a group of sub-items, corresponding to said ones of said collateral information items read out by said reading-out means, from which said at least one sub-item is to be selected are displayed as candidate sub-items for registration on said display means, and the class code of one of said collateral information items corresponding to the specific sub-item is referenced at a time of registration, so that correct sub-item information can be inputted.

3. An electronic register according to claim 2, wherein said input means comprises a keyboard, wherein, at a time of displaying the candidate sub-items for registration, sub-item names and display line numbers corresponding to said sub-item names are displayed on said display means, and wherein one of said display line numbers corresponding to said specific sub-item is issued by manipulation of keys on said keyboard.

4. An electronic register according to claim 3, wherein each of the display line numbers has fewer than three digits.

5. An electronic register according to claim 1, wherein said display means simultaneously displays both said PLU item to be registered and said item names.

6. An electronic register according to claim 1, wherein each of said collateral information items stored in said PLU file further comprises a sub-item status code indicating whether said each of said items of collateral information is a sub-item.

7. An electronic register according to claim 1, wherein each of said collateral information items stored in said PLU file further comprises a unit price.

8. An electronic register according to claim 1, wherein said display means displays display line numbers corresponding to said displayed item names, and wherein said input means comprises means for receiving an input of one of said display line numbers corresponding to said selection.

9. An electronic register according to claim 1, wherein said input means comprises a keyboard.

10. An electronic register comprising:
   an input means;
   a memory having set areas for respective PLU files to be stored with previous set data, the memory further storing totalized and registered data;
   a display unit for displaying data to be displayed;
   setting means for storing information items in the respective PLU files, some of the information items being collateral information items, each of the information items including a PLU code allotted to an individual sales item, an item name, a unit price, compulsory input status information indicating whether an input of said individual sales item requires an input of collateral information contained in one of the collateral information items, sub-item status information indicating whether the information item is one of the collateral information items, and a class code indicating with which sales item the information item is to be linked if the information item is one of the collateral information items; means for causing said display unit to display as candidates for registration ones of the collateral information items which have a class code that matches the class code of an information item corresponding to a registered sales item when the compulsory input status information of the information item corresponding to a registered sales item indicates a requirement for collateral information; and registering means for registering the collateral information contained in one of the candidates for registration selected through the input means.

11. An electronic register according to claim 10, wherein said keyboard has a plurality of numeric keys and special-purpose keys.

12. An electronic register according to claim 10, wherein said display unit displays a display line number for each of the candidates for registration.

13. An electronic register according to claim 10, wherein said input means comprises a keyboard.

14. An electronic register according to claim 13, wherein said keyboard has a plurality of numeric keys and special purpose keys.

* * * * *